(12) United States Patent
Pleiman et al.

(10) Patent No.: US 10,730,414 B2
(45) Date of Patent: Aug. 4, 2020

(54) ADJUSTABLE HEADREST FOR CHILD CAR SEAT

(71) Applicant: Evenflo Company, Inc., Miamisburg, OH (US)

(72) Inventors: Brian R. Pleiman, Troy, OH (US); Andrew R. Davis, Huber Heights, OH (US)

(73) Assignee: EVENFLO COMPANY, INC., Miamisburg, OH (US)

( * ) Notice: Subject to any disclaimer, the term of this patent is extended or adjusted under 35 U.S.C. 154(b) by 90 days.

(21) Appl. No.: 15/837,231

(22) Filed: Dec. 11, 2017

(65) Prior Publication Data
US 2019/0176662 A1    Jun. 13, 2019

(51) Int. Cl.
*B60N 2/28* (2006.01)

(52) U.S. Cl.
CPC ................... *B60N 2/2851* (2013.01)

(58) Field of Classification Search
CPC .... B60N 2/2851; B60N 2/2875; B60N 2/809; B60N 2/847
See application file for complete search history.

(56) References Cited

U.S. PATENT DOCUMENTS

| | | | | |
|---|---|---|---|---|
| 6,135,553 A | * | 10/2000 | Lovie | B60N 2/2821 297/250.1 |
| 6,773,065 B1 | * | 8/2004 | Stamper | A47D 5/006 297/250.1 |
| 7,862,117 B2 | * | 1/2011 | Hutchinson | B60N 2/2806 297/250.1 |
| 9,738,182 B2 | * | 8/2017 | Pos | B60N 2/2812 |
| 2006/0033374 A1 | * | 2/2006 | Pos | B60N 2/2851 297/397 |
| 2007/0188002 A1 | * | 8/2007 | Jane Santamaria | A47D 13/02 297/256.1 |
| 2010/0253120 A1 | * | 10/2010 | Heisey | B60N 2/2812 297/250.1 |
| 2016/0046213 A1 | * | 2/2016 | Kirstein | B60N 2/2875 297/256.13 |
| 2016/0144749 A1 | * | 5/2016 | Mo | B60N 2/22 297/256.11 |
| 2017/0008429 A1 | * | 1/2017 | Johnson | B60N 2/2872 |
| 2017/0166097 A1 | * | 6/2017 | Mo | B60N 2/2821 |
| 2018/0257519 A1 | * | 9/2018 | Coakley | B60N 2/2851 |

* cited by examiner

*Primary Examiner* — David R Dunn
*Assistant Examiner* — Christopher E Veraa
(74) *Attorney, Agent, or Firm* — BakerHostetler

(57) ABSTRACT

Disclosed herein is a child car seat comprised of a shell and an adjustable assembly including a headrest member and a backrest member mounted for sliding movement relative to the shell.

15 Claims, 13 Drawing Sheets

ADJUSTABLE HEADREST FOR CHILD CAR SEAT

TECHNICAL FIELD

The present disclosure relates to car seats. More particularly, the present disclosure relates to car seats comprised of a shell and an adjustable assembly mounted for sliding movement relative to the shell.

BACKGROUND

In the United States, child car seats are required by law and recommended for children of certain ages or sizes. There are many types of car seats available for purchase. Infant car seats recommended for children under age 1 are typically rear-facing. Many infant car seats include a base that is belted or tethered into the car and a seat that may latch into the base. The seat often includes a handle so that the seat may be carried when it is unlatched from the base (i.e., from the car). A popular car seat option for infants as well as children is a "convertible" car seat that may be oriented in a rear-facing position and then "converted" to a front-facing position for accommodating older children.

Conventional convertible car seats are typically designed as a solid, single-piece structure with an included angle between the seating surface and the seat back that cannot be freely adjusted. The headrests of conventional convertible car seats also typically lack the ability to tilt forward or rearward.

It would be desirable to provide a convertible car seat with adjustable components. So far, however, there have been limited situations of manufacturers offering car seats having components that are adjustable to accommodate a wide range of persons from infants to children eight-years-old or older, namely headrest and backrests that are capable of being angled or tilted. Accordingly, it is desired to provide a child car seat having an adjustable assembly including a headrest member and a backrest member mounted for sliding movement relative to the shell that provides the desired amount of adjustability to the car seat to accommodate a wide range of infants and children of various ages and sizes.

BRIEF SUMMARY

Disclosed herein are car seats, which may be comprised of a shell and an adjustable assembly including a headrest member and a backrest member mounted for sliding movement relative to the shell. The raising or lowering of the adjustment assembly (i.e., movement up and down relative to the shell) may be designed to automatically adjust the headrest member and the backrest member to tilt according to predetermined angular orientations.

The headrest member of the adjustable assembly may preferably automatically adjust and tilt between predetermined angular orientations as the adjustable assembly is raised and lowered. The angling backward of the front surface of the headrest member as the adjustable assembly is lowered may aid in ensuring that the occupant's head is tilted slightly backward (i.e., as opposed to tilting forward toward the occupant's lap), which may thereby promote an open airway for the occupant, which may be important when the occupant is an infant or small child.

The backrest member of the adjustable assembly may also preferably automatically adjust and tilt between predetermined angular orientations as the adjustable assembly is raised and lowered. The angling backward of the backrest member as the adjustable assembly is lowered may aid in increasing the included angle and may ensure that the occupant's midsection is stretched (i.e., as opposed to being slouched forward), which may thereby promote digestion for the occupant, which may again be important when the occupant is an infant or small child.

The angling backward of the backrest member as the adjustable assembly is lowered may further lessen the usable depth of the seat portion of the shell, which may be useful for smaller occupants as it may aid in ensuring that the occupant is seated closely to the hip belts and crotch buckle, which may thereby provide a better and safer fit for the occupant. Raising and lowering of the adjustment assembly further provides for the harness straps to be positioned near the occupant's shoulders (i.e., further or closer to the seat portion of the shell), which may again provide a better and safer fit for the occupant.

In accordance with the foregoing, disclosed in exemplary embodiments herein are child car seats. In accordance with particular embodiments of the present disclosure, an exemplary child car seat comprises: a shell including a seat portion and a back portion extending upwardly away from the seat portion; and an adjustable assembly mounted for sliding movement relative to the shell and positionable between at least an uppermost position and a lowermost position, the adjustable assembly including a headrest member and a backrest member; wherein a first angle is defined between a front surface of the backrest member and a front surface of the headrest member; and wherein movement of the adjustable assembly downwardly toward the seat portion of the shell increases the first angle, and movement of the adjustable assembly upwardly away from the seat portion of the shell decreases the first angle.

In certain constructions, a lower end of the of the headrest member may be transversely hingedly connected to an upper end of the backrest member.

In accordance with embodiments of the disclosure, the first angle may be less than or equal to 180° when the adjustable assembly is in the uppermost position. The first angle may be greater than 180° when the adjustable assembly is in the lowermost position. When the adjustable assembly is in the lowermost position, a lower end of the backrest member may be positioned contiguously with a top surface of the seat portion of the shell. Further, when the adjustable assembly is in the lowermost position, a second angle defined between the front surface of the backrest member and the top surface of the seat portion of the shell may be greater than 90°.

In accordance with embodiments of the disclosure, the backrest member may include at least one harness slot proximate an upper end thereof. Movement of the adjustable assembly downwardly toward the seat portion of the shell may decrease the distance between the harness slot and a top surface of the seat portion of the shell.

In certain constructions, the car seat may further comprise at least one cam rocker. The at least one cam rocker may be adapted to pass through a slot in the back portion of the shell and contiguously engage with a rear surface of the backrest member to urge a lower end of the backrest member toward a forward end of the seat portion of the shell when the adjustable assembly is moved downwardly toward the seat portion of the shell.

In accordance with embodiments of the disclosure, the back portion of the shell may include a first pair of tracks defining a first groove therebetween that curves from a top end to a bottom end thereof, and a second pair of tracks defining a second groove therebetween that curves from a top end to a bottom end thereof. The headrest member may include top and bottom pivots, one of which rides within the first groove and the other of which rides outside the first groove (e.g., along an outer edge of the first pair of tracks) when the adjustable assembly is moved relative to the shell. The cam rocker may ride within the second groove when the adjustable assembly is moved relative to the shell.

In accordance with particular embodiments of the present disclosure, another exemplary child car seat comprises: a shell including a seat portion having a forward end and a rear end and a back portion having an upper end and a lower end, the back portion extending upwardly away from the rear end of the seat portion; and an adjustable assembly mounted for sliding movement relative to the shell and positionable between at least an uppermost position and a lowermost position, the adjustable assembly including a headrest member having an upper end and a lower end and a backrest member having an upper end and a lower end; wherein movement of the adjustable assembly downwardly toward the seat portion of the shell urges the lower end of the backrest member closer to the forward end of the seat portion of the shell, thereby effectively lessening a usable depth of the seat portion of the shell.

In accordance with other particular embodiments of the present disclosure, an exemplary child car seat comprises: a shell including a seat portion and a back portion extending upwardly away from the seat portion, the back portion including a slot, a first pair of tracks defining a first groove therebetween that curves from a top end to a bottom end thereof, and a second pair of tracks defining a second groove therebetween that curves from a top end to a bottom end thereof; an adjustable assembly mounted for sliding movement relative to the shell, the adjustable assembly including a headrest member and a backrest member hingedly connected to one another, the headrest member including top and bottom pivots, one of which rides within the first groove and the other of which rides outside the first groove when the adjustable assembly is moved relative to the shell; and at least one cam rocker adapted to pass through the at least one slot in the back portion of the shell and contiguously engage with a rear surface of the backrest member to urge the lower end of the backrest member outwardly away from the shell when the adjustable assembly is moved downwardly toward the seat portion of the shell, wherein the at least one cam rocker rides within the second groove when the adjustable assembly is moved relative to the shell.

In certain constructions, the adjustable assembly may include a release handle. The release handle may be located proximate the upper end of the headrest member. The release handle may be adapted to selectively move and position the adjustable assembly relative to the shell.

In accordance with embodiments of the disclosure, the rocker cam may be operatively connected to the headrest member.

Other aspects of the invention may be apparent to those of ordinary skill with review of the attached drawings, appended claims, and additional description.

BRIEF DESCRIPTION OF THE DRAWINGS

The foregoing and other features of the present disclosure will become more fully apparent from the following description and appended claims, taken in conjunction with the accompanying drawings. Understanding that these drawings depict several examples in accordance with the disclosure and are, therefore, not to be considered limiting of its scope, the disclosure is described with additional specificity and detail below through the use of the accompanying drawings.

DETAILED DESCRIPTION

Figure 1:
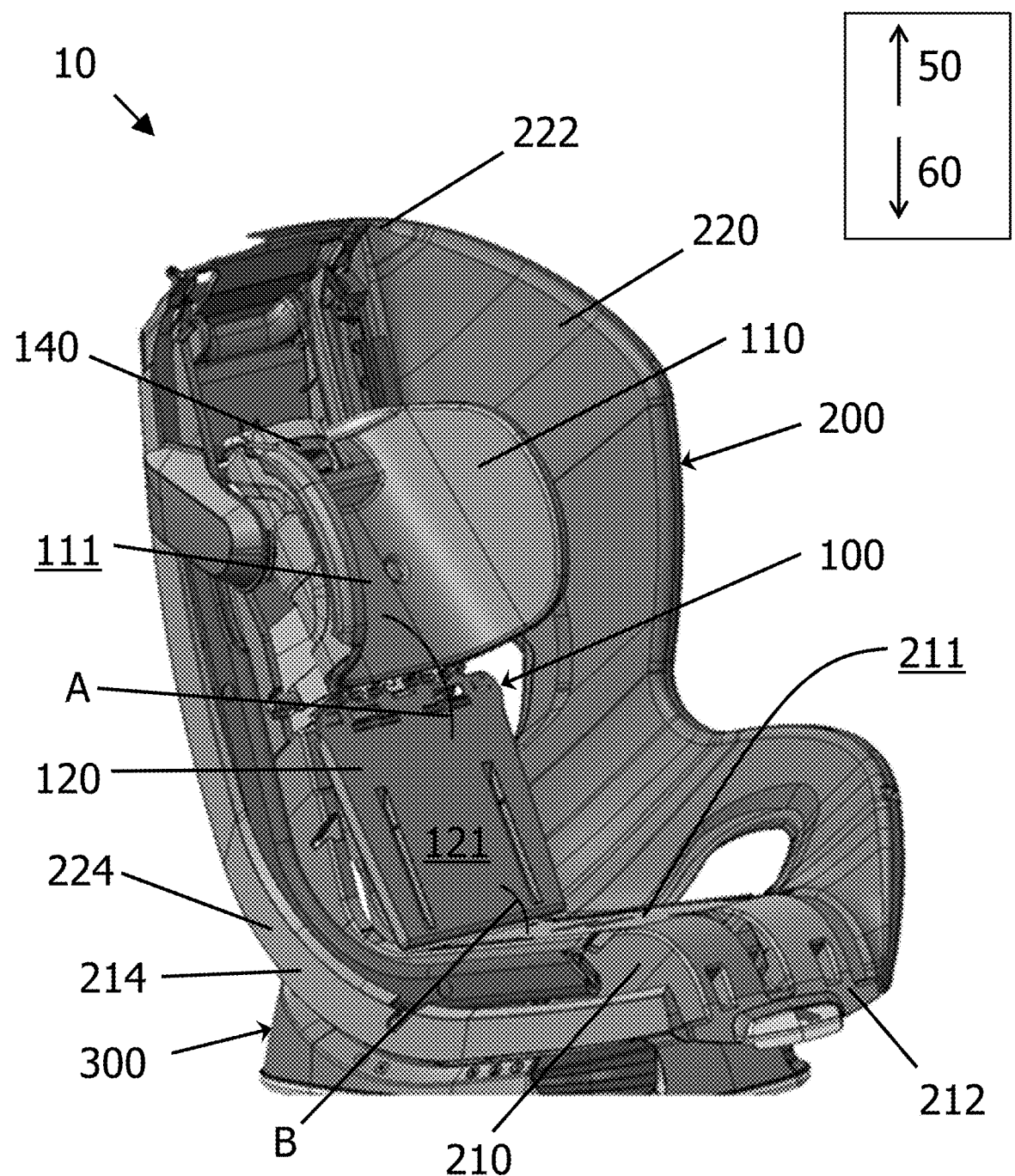
FIG. 1 is a perspective view of a child car seat incorporating an adjustable assembly in the lowermost position in accordance with the disclosure.

In the following detailed description, reference is made to the accompanying drawings, which form a part hereof. In the drawings, similar symbols identify similar components, unless context dictates otherwise. The illustrative examples described in the detailed description and drawings are not meant to be limiting and are for explanatory purposes. Other examples may be utilized, and other changes may be made, without departing from the spirit or scope of the subject matter presented herein. It will be readily understood that the aspects of the present disclosure, as generally described herein and illustrated in the drawings, may be arranged, substituted, combined, and designed in a wide variety of different configurations, each of which are explicitly contemplated and form a part of this disclosure.

It should be noted that some of the terms used herein may be relative terms. For example, the terms "upper" and "lower" are relative to each other in location, i.e. an upper component is located at a higher elevation than a lower component in a given orientation, but these terms may change if the device is flipped. An intermediate component, on the other hand, is always located between an upper component and a lower component regardless of orientation. The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "top" and "bottom" or "base" are used to refer to surfaces where the top is always higher than the bottom/base relative to an absolute reference, i.e. the surface of the earth. The terms "upwards" or "upwardly" and "downwards" or "downwardly" are also relative to an absolute reference; upwards is always against the gravity of the earth. The term "parallel" should be construed in its lay sense of two surfaces that maintain a generally constant distance between them, and not in the strict mathematical sense that such surfaces will never intersect when extended to infinity. The terms "operative to" and "adapted to" and similar terms are used herein to describe that a particular component has certain structural features designed to perform a designated function. Such components should be construed as having the expressed structure, with the designated function being considered part of the structure.

In accordance with aspects of the disclosure, exemplary embodiments of child car seats are illustrated in various levels of specificity in FIGS. 1-13. Very generally, car seat 10 is designed for safely transporting an infant or child in a car. Child car seat 10 may include a body or shell 200, which may, in certain embodiments, be supported on a base 300. As will be readily understood by those skilled in the art, the car seat 10 (and, when provided, the base) may be affixed to the seat of a car, such as by the seat belt of the car. An adjustable assembly 100 may be incorporated into an aspect of the car seat 10 (see, e.g. FIGS. 1, 8, and 9), thereby making car seat 10 a convertible car seat (i.e., capable of switching from a rearward-facing infant carrier to a forward-facing child carrier by selectively positioning the adjustable assembly so as to accommodate the infant or child occupant).

Figure 8:
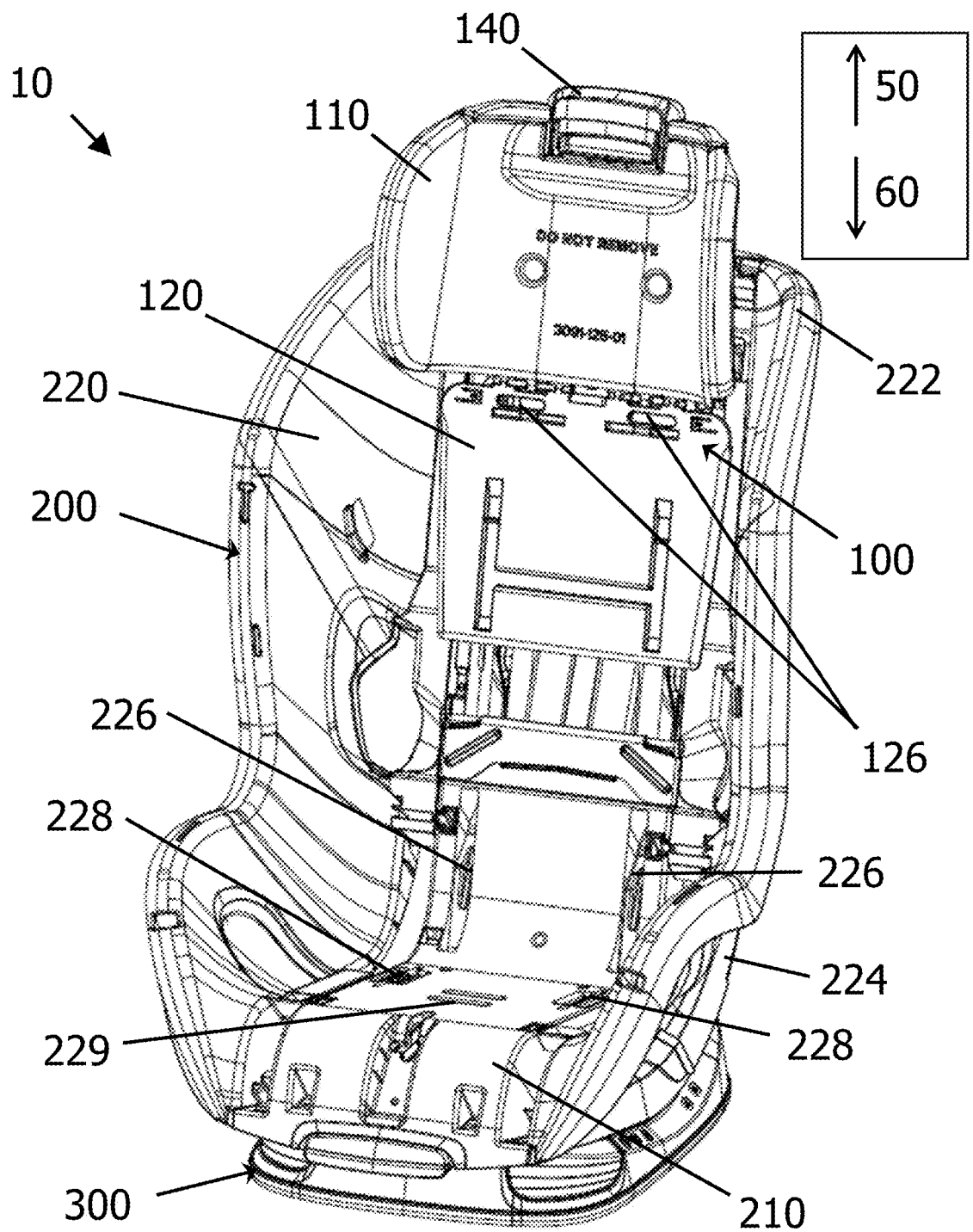
FIG. 8 is a perspective view of a child car seat incorporating an adjustable assembly in the uppermost position in accordance with the disclosure.
Figure 9:
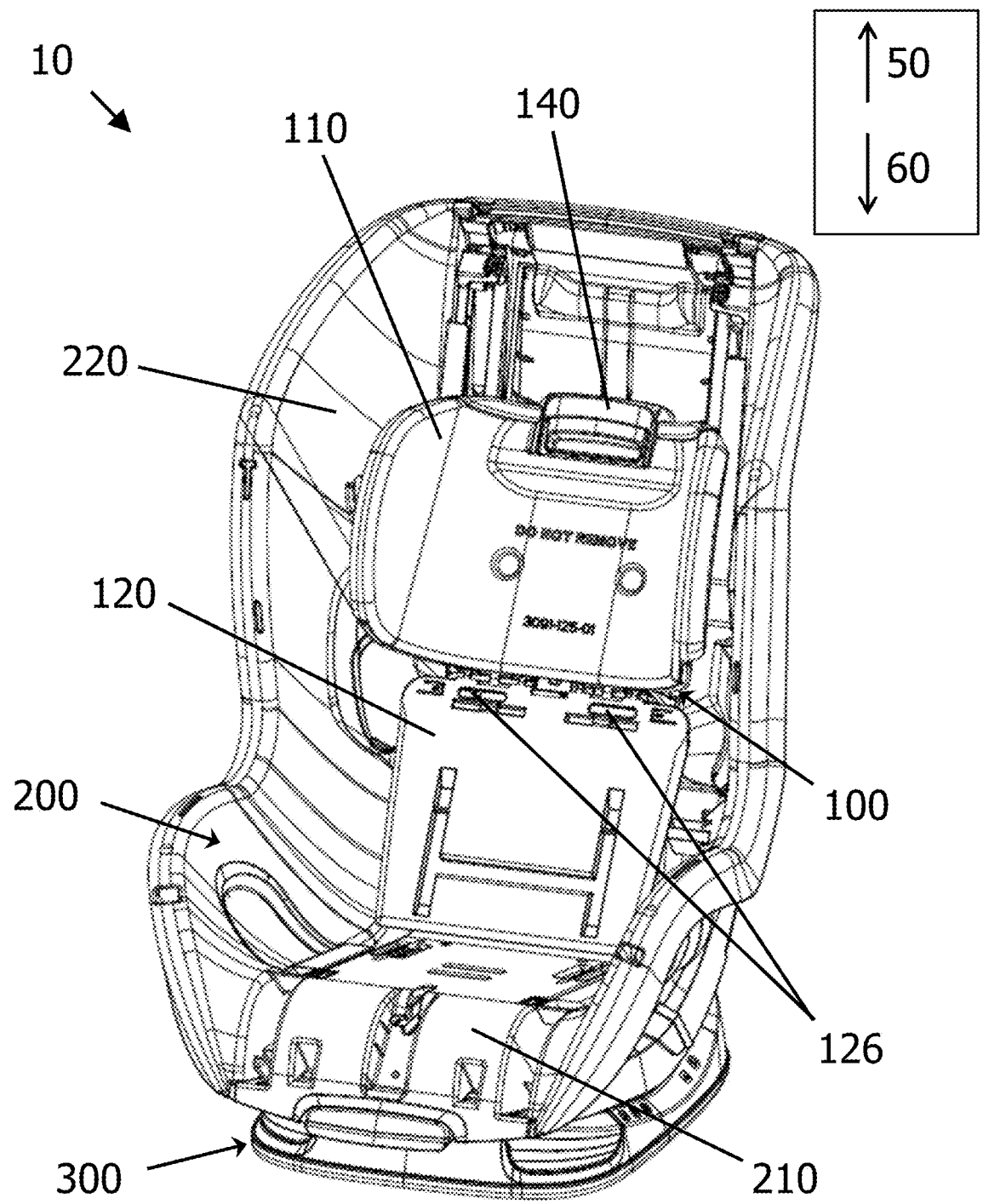
FIG. 9 is a perspective view of the child car seat of FIG. 8 with the adjustable assembly in the lowermost position.

Very generally, the shell 200 may support and stabilize an occupant (e.g., an infant or child) therein. In particular, the shell 200 may include a seat portion 210 and a back portion 220. The seat portion 210 of the shell 200 may generally operate as a seating surface for the occupant by supporting and stabilizing the butt of an occupant. For example, an occupant may be seated upon a top surface 211 of the seat portion 210 of the shell. The seat portion 210 may include a forward end 212 and opposite rear end 214. Similarly, the back portion 220 may include an upper end 222 and an opposite lower end 224. As best seen in FIGS. 1, 8, and 9, the back portion 220 may extend upwardly away (i.e., in the direction of arrow 50) from the seat portion 210, such as extending upwardly from the rear end 214 of the seat portion 210.

The adjustable assembly 100 may be operatively connected to the shell 200. In particular, the adjustable assembly 100 may be mounted for sliding movement relative to the shell 200 (e.g., upwardly in the direction of arrow 50 away from the seat portion 210 of the shell 200 or downwardly in the direction of arrow 60 toward the seat portion 210 of the shell 200). More specifically, the adjustable assembly 100 may be positionable at various positions relative to the shell 200, such as, for example, a lowermost position (as shown in FIGS. 1-3 and 9) and an uppermost position (as shown in FIGS. 4, 5, 7, and 8). The adjustable assembly 100 may further, in certain embodiments, be positionable intermediately between the lowermost and uppermost positions as desired. The ability to position the adjustable assembly 100 at various positions relative to the shell 200 allows a user to selectively position the adjustable assembly 100 so as to best fit a given occupant. By way of example, for infants or other occupants of smaller size, the adjustable assembly 100 may be positioned in or closer to the lowermost position so as to better accommodate the small occupant. Then, as the occupant grows or the user desires to use the car seat with a larger occupant, the adjustable assembly 100 may be raised (i.e., in the direction of arrow 50) and positioned in or closer to the uppermost position so as to better accommodate the larger occupant.

In certain constructions, the adjustable assembly 100 may be comprised of a headrest member 110 and a backrest member 120. The headrest member 110 may, in certain constructions, be hingedly connected to the backrest member 120.

The headrest member 110 may have an upper end 112 and an opposite lower end 114. The headrest member 110 may further include a front surface 111 defined between the upper and lower ends 112, 114 thereof. When the adjustable assembly 100 is in the uppermost position (as shown in FIGS. 4, 5, 7, and 8), the upper end 112 of the headrest 110 may extend beyond the upper end 222 of the back portion 220 of the shell 200. Similar to the headrest member, the backrest member 120 may have an upper end 122 and an opposite lower end 124, and, in particular embodiments, may include a front surface 121 defined between the upper and lower ends 122, 124 thereof. In certain constructions, the lower end 114 of the headrest member 110 may be transversely hingedly connected to the upper end 124 of the backrest member 120. In this way, movement of the headrest member 110 may effect movement of the backrest member 120. It should be noted that while the drawings of the present disclosure depict the headrest member 110 as hingedly connected to the backrest member 120 by a pin arrangement, the present disclosure is not limited to such embodiment and encompasses embodiments wherein the hinged connection is a continuous hinge, a "living hinge," or another hinged connection means that allow the headrest member 110 and the backrest member 120 to be connected to and tilted relative to one another.

A first angle A may be defined between the front surface 111 of the headrest member 110 and the front surface 121 of the backrest member 120. As will be appreciated and explained in greater detail herein, movement of the adjustable assembly 100 relative to the shell 200 may cause the first angle A to change (i.e., cause an increase or decrease in the degree of the first angle). In particular, as may be seen by comparing FIG. 1 to FIG. 4, movement of the adjustable assembly 100 downwardly in the direction of arrow 60 toward the seat portion 210 of the shell 200 may increase the first angle A, while movement of the adjustable assembly 100 upwardly in the direction of arrow 50 away from the seat portion 210 of the shell 200 may decrease the first angle A.

Moreover, when the adjustable assembly 100 is in the lowermost position (as shown in FIGS. 1-3 and 9), the front surface 111 of the headrest member 110 may be tilted backwards from a plane defined by the front surface 121 of the backrest member 120. Put another way, when the adjustable assembly 100 is in the lowermost position, the first angle A defined between the front surface 111 of the headrest member 110 and the front surface 121 of the backrest member 120 may be greater than 180°. In comparison, when the adjustable assembly 100 is in the uppermost position (as shown in FIGS. 4, 5, 7, and 8), the front surface 111 of the headrest member 110 may be tilted forward or substantially co-planar with the front surface 121 of the backrest member 120. Put another way, when the adjustable assembly 100 is in the uppermost position, the first angle A defined between the front surface 111 of the headrest member 110 and the front surface 121 of the backrest member 120 may be less than or equal to 180°. In other words, the magnitude of the first angle A defined between the front surface 111 of the headrest member 110 and the front surface 121 of the backrest member 120 (i.e., the amount or degree that the headrest member 110 is tilted relative to the backrest member 120) may be at its greatest when the adjustable assembly 100 is in the lowermost position and may be at its least when the adjustable assembly 100 is in the uppermost position.

As explained above, positioning the adjustable assembly 100 in the lowermost position may be preferable when the occupant is an infant or small child. In particular, the tilting backward of the headrest member 110 when the adjustable assembly 100 is in the lowermost position may promote an open airway for an occupant of the car seat. That is, when that the occupant's head is rested against the titled-back headrest member 100, the occupant's head will not be slouched over, thereby promoting an open airway, which may be important for infants or small children. Conversely, when it may become less desirable or necessary to tilt the occupant's head backwards, the adjustable assembly 100 may be lifted, which may cause the amount or degree that the headrest member 110 is tilted relative to the backrest member 120 to be lessened (i.e., lowering the degree of the first angle A).

With reference to FIGS. 1-3 and 9, the backrest member 120 may be tilted relative to the back portion 220 or the back 202 of the shell 200 when the adjustable assembly 100 is in the lowermost position. In this position, the lower end 124 of the backrest member 120 may be positioned contiguously with the top surface 211 of the seat portion 210 of the shell 200. Further, when the adjustable assembly 100 is in the lowermost position, a second angle B may be defined between the front surface 121 of the backrest member 120 and the top surface 211 of the seat portion 210 of the shell 210. Because of the tilting of the backrest member 120 in this position, the second angle B may be greater than 90°. Put another way, the backrest member 120 may be tilted such that the lower end 124 thereof is positioned nearer to the forward end 212 of the seat portion 210 of the shell 200 than the upper end 122 of the backrest member 120. This may be an important distinction over conventional child car seats having a non-adjustable included angle (i.e., having a predetermined and non-adjustable second angle B).

As will be appreciated, though not depicted, the child car seat 10 in accordance with the disclosure may be provided with a harness including shoulder straps, hip belts, a crotch strap, a buckle, and other components common to most child car seats. In this regard, the backrest member 120 may include one or more harness slots 126 designed to accommodate a harness strap passing therethrough.

Figure 2:
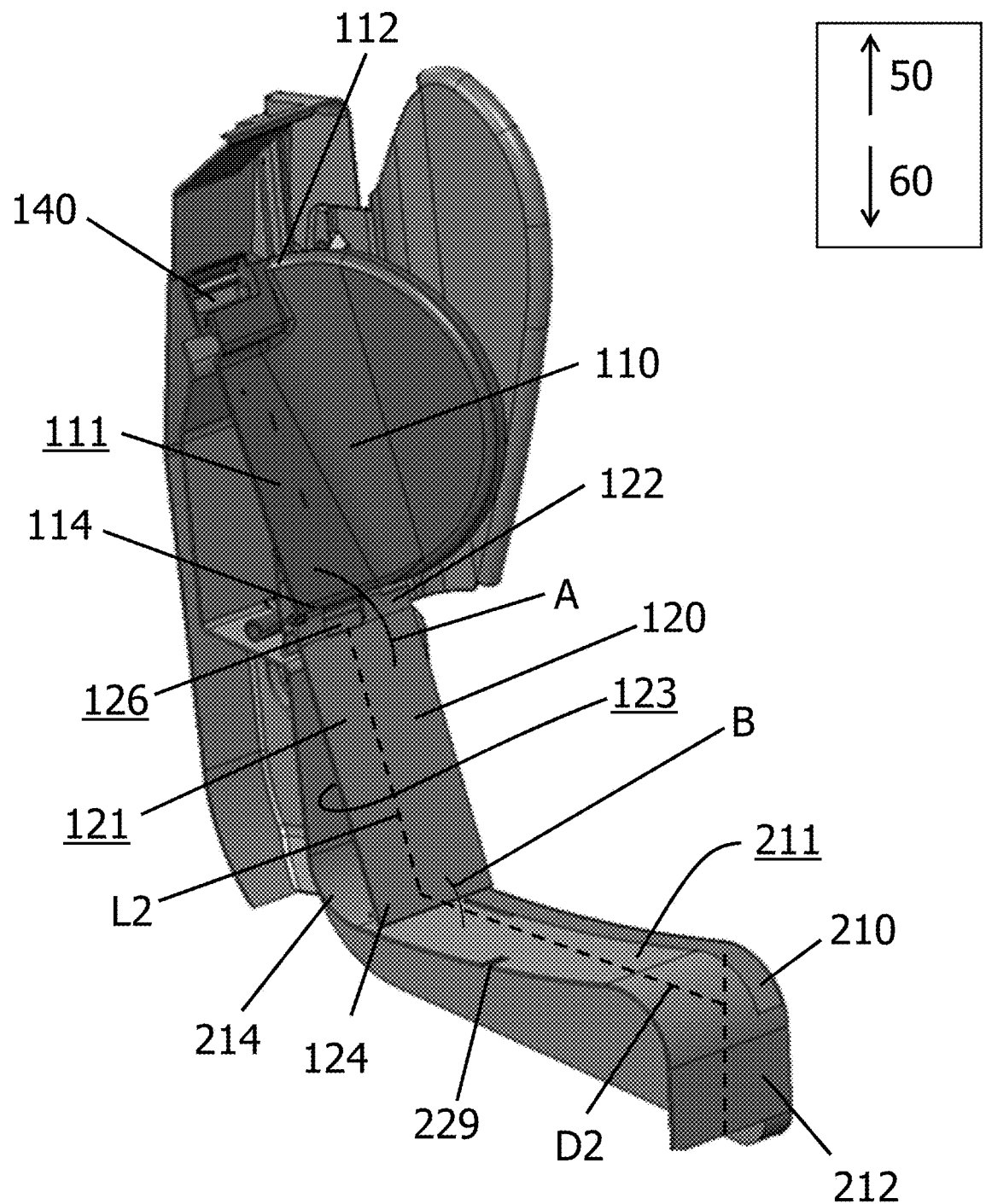
FIG. 2 is a perspective sectional view of the child car seat of FIG. 1 with the adjustable assembly in the lowermost position.
Figure 4:
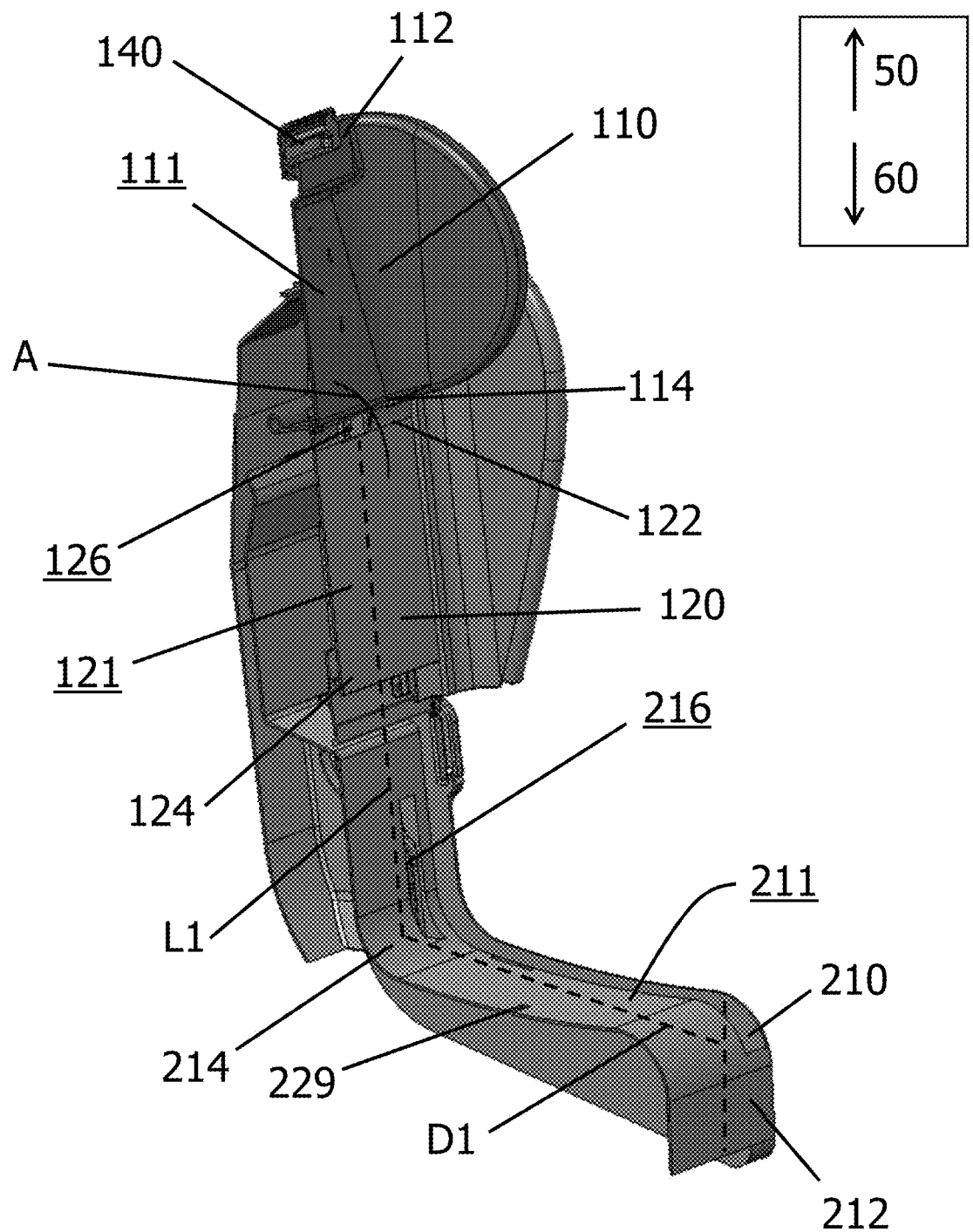
FIG. 4 is a perspective sectional view of the child car seat of FIG. 1 with the adjustable assembly in the uppermost position.

As shown in FIG. 2 and FIG. 4, the harness slot(s) 126 in the backrest member 120 may be located proximate the upper end 122 of the backrest member 120. Movement of the adjustable assembly 100 may increase the distance between the harness slot(s) 126 and the top surface 211 of the seat portion 210 of the shell 200. More specifically, when the adjustable assembly is in the lowermost position as shown in FIG. 2, the harness slot(s) 126 may be located a distance L2 from the top surface 211 of the seat portion 210 of the shell 200. In comparison, when the adjustable assembly is in the uppermost position as shown in FIG. 4, the harness slot(s) 126 may be located a distance l1 from the top surface 211 of the seat portion 210 of the shell 200.

As may be seen by comparing FIG. 2 and FIG. 4, the distance between the harness slot(s) 126 and the top surface 211 of the seat portion 210 of the shell 200 may generally be greater when the adjustable assembly 100 is in the uppermost position (i.e., distance L1 may generally be greater than distance L2). Put another way, movement of the adjustable assembly 100 downwardly in the direction of arrow 60 toward the seat portion 210 of the shell 200 may generally decrease the distance between the harness slot(s) 126 and the top surface 211 of the seat portion 210. On the other hand, movement of the adjustable assembly 100 upwardly in the direction of arrow 50 away from the seat portion 210 of the shell 200 may generally increase the distance between the harness slot(s) 126 and the top surface 211 of the seat portion 210.

In this way, the adjustable assembly 100 may be positioned by a user to accommodate occupants of varying heights. For example, when the desired occupant is an infant or short occupant, the adjustable assembly may be positioned at or closer to the lowermost position so as to lessen the distance between the harness slot(s) and the seat portion and provide a better fit. Conversely, when the desired occupant is an older child or taller occupant, the adjustable assembly may be positioned at or closer to the uppermost position so as to increase the distance between the harness slot(s) and the seat portion and provide a better fit. In this regard, the adjustable assembly may generally be positioned such that the harness slot(s) are just above the occupant's shoulders, thereby providing a comfortable and safe fit for the shoulder harness straps over the occupant's shoulders.

With continued reference to FIG. 2 and FIG. 4, the seat portion 110 of the shell 100 may generally be defined as having a usable depth corresponding to the portion of the top surface 211 of the seat portion 110 from the forward end 212 of the seat portion 210 toward the rear end 214 thereof that could operate as a seating surface to support an occupant's butt. In FIG. 2, the seat portion 210 may have a usable depth D2. In FIG. 4, the seat portion 210 may have a usable depth D1. As may be seen by comparing FIG. 2 and FIG. 4, the usable depth of the seat portion may be greater when the adjustable assembly 100 is in the uppermost position (FIG. 4) than when the adjustable assembly 100 is in the lowermost position (FIG. 2) (i.e., usable depth D1 may be greater than usable depth D2).

The difference in the usable depth of the seat portion 210 is attributable to the tilting of the backrest member 120 when the adjustable assembly 100 is in the uppermost position. Put another way, the tilting of the backrest member 120 may effectively lessen the usable depth of the seat portion 210 (e.g., from D1 to D2). As will be appreciated, when the adjustable assembly is in the uppermost position (as shown in FIG. 4), the entirety of the top surface 211 of the seat portion 210 is usable as a seating surface from the forward end 212 thereof to where the lower end 224 of the back portion 220 meets the rear end 214 of the seat portion 210. Conversely, when the adjustable assembly is in the lowermost position (as shown in FIG. 2), only a portion of the top surface 211 of the seat portion 210 is usable as a seating surface. In particular, because the backrest member 120 is tilted with the lower end 124 of the backrest member 120 urged toward the forward end 212 of the seat portion 210, the portion of the top surface 211 of the seat portion 210 between the rear end 214 thereof and the rear surface 123 of the backrest member 120 may be rendered unusable as a seating surface (i.e., the usable depth of the top surface 211 of the seat portion 210 may be effectively lessened).

In view of the foregoing, the occupant of the car seat may be positioned closer to the forward end 212 of the seat portion 210 when the adjustable assembly 100 is in the lowermost position than when the adjustable assembly 100 is in the uppermost position. In this way, the adjustable assembly 100 may be positioned by a user to accommodate occupants of varying heights. For example, when the desired occupant is an infant or short occupant, the adjustable assembly may be positioned at or closer to the lowermost position so as to lessen the usable depth of the seat portion, thereby allowing the occupant's legs to comfortably dangle over the forward end of the seat portion and providing a safe yet comfortable between the crotch buckle slot and the occupant.

Conversely, when the desired occupant is an older child or taller occupant, the adjustable assembly may be positioned at or closer to the uppermost position so as to increase the usable depth, again allowing the occupant's legs to comfortably dangle over the forward end of the seat portion and providing a safe yet comfortable fit between the crotch buckle slot and the occupant. In this regard, the adjustable assembly may generally be positioned such that the crotch buckle slot is a safe yet comfortable distance from the occupant, thereby providing a comfortable and safe fit for the crotch buckle and hip belts over the occupant's crotch and legs.

As explained in detail herein, as the adjustable assembly 100 is lowered toward the seat portion 210 (i.e., in the direction of arrow 60), the upper end 112 of the headrest member 110 may automatically tilt rearward. As may be best seen in FIG. 5 and FIG. 6, tilting of the headrest member 110 may be achieved by providing the headrest member 110 with one or more pivots. For example, the headrest member 110 may include a top pivot 116 and a bottom pivot 118 spaced apart from the top pivot 116. The top and bottom pivots 116 may be posts, pegs, protrusions, or any other structure adapted to operate as a pivot. In certain constructions, such as those depicted in FIG. 12 and FIG. 13, the bottom pivot 118 may be a headrest tube 160 that is adapted to operate as a pivot, as explained herein.

Figure 5:
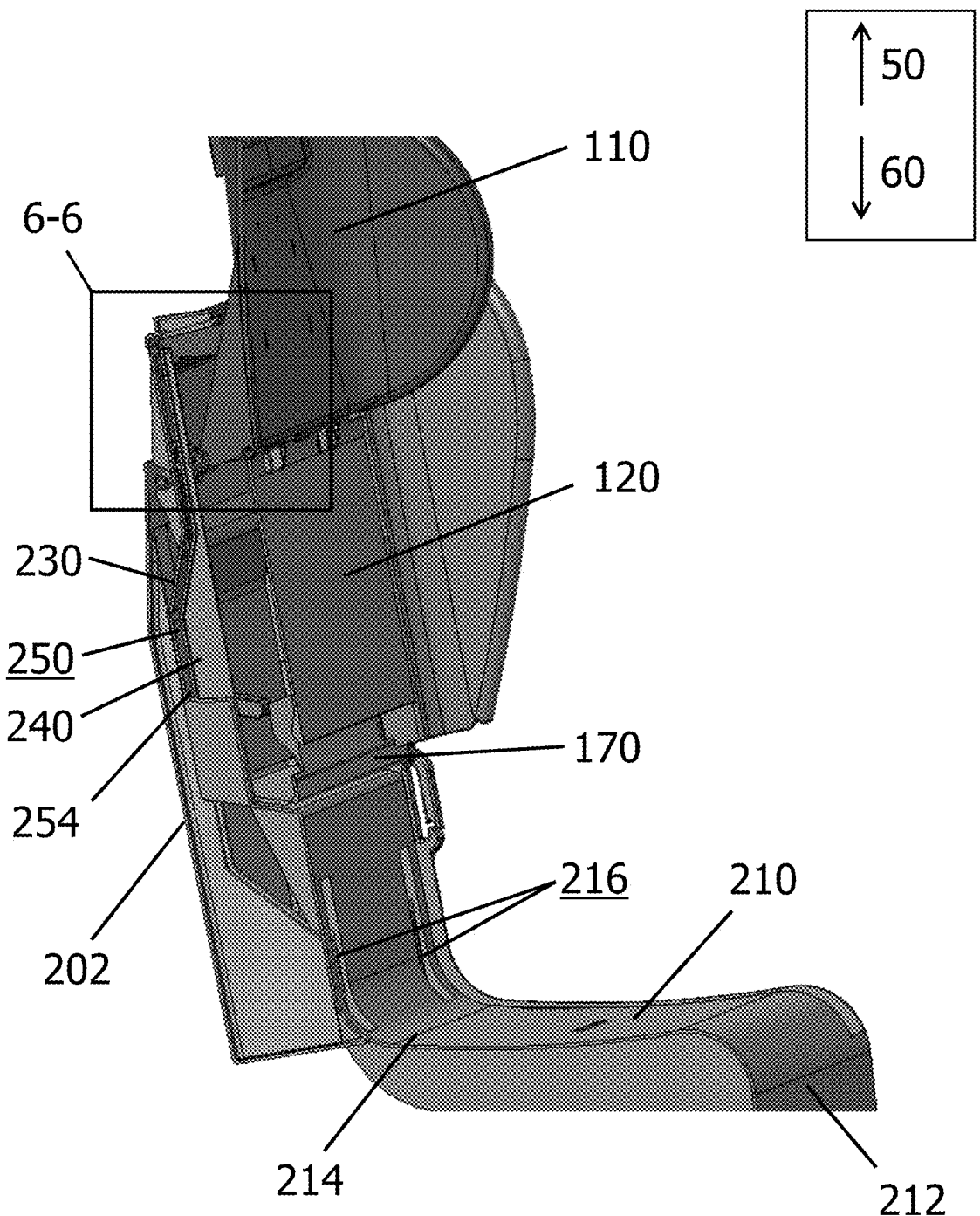
FIG. 5 is a perspective cutaway view of the child car seat of FIG. 1 with the adjustable assembly in the uppermost position.
Figure 6:
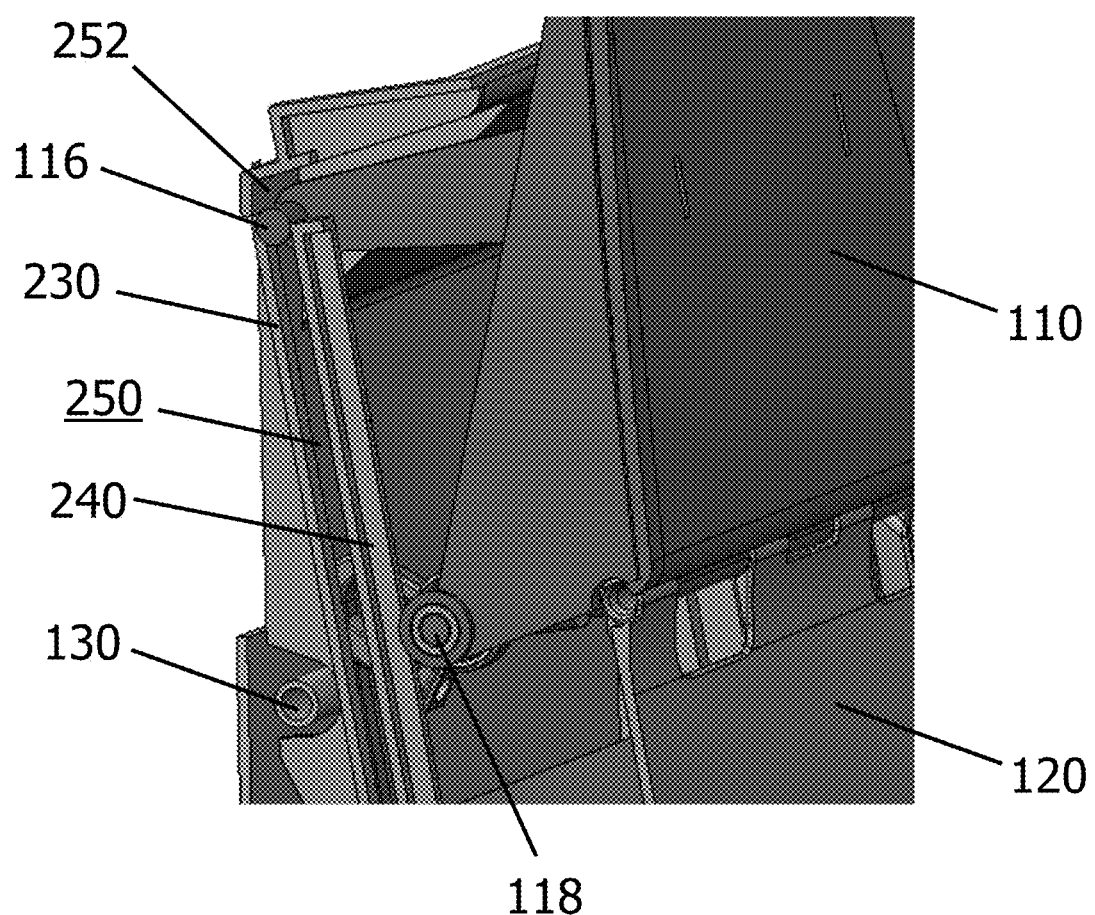
FIG. 6 is an enlarged side perspective view of Section 5-5 of FIG. 4 with the adjustable assembly in the uppermost position.

The shell 200 may include a first pair of tracks adapted to accommodate one or more of the top and bottom pivots 116, 118 of the headrest member 110. For example, the first pair of tracks may include a lower track 230 and an upper track 240 that define a groove 250 therebetween. It should be noted that while FIG. 5 and FIG. 6 depict the groove 250 as a hollow space running between the lower and upper tracks 230, 240 the present disclosure is not limited to such embodiment and encompasses embodiments wherein the groove is designed as a notched or other non-hollow space sufficient to accommodate one or more of the top and bottom pivots of the headrest and may be of various different configurations, structures, sizes, or shapes.

The groove 250 may be curved from a top end 252 to a bottom end 254 thereof. In particular, as depicted in FIG. 5, the groove 250 may be curved such that its bottom end 254 is located closer to a back 202 of the shell 200 than its top end 252. In such constructions, as may be best seen in FIG. 6, the top pivot 116 of the headrest member 110 may ride within the groove 250 as the adjustable assembly is raised and lowered. On the other hand, the bottom pivot 118 of the headrest member 110 may ride outside the groove 250 (i.e., along an outer edge of the upper track 240) as the adjustable assembly is raised and lowered.

The track along which one of the pivots rides (in this embodiment the upper track 240 along which the bottom pivot 118 rides outside the groove 250) may generally be designed so as to have a planar profile, such that said track does not curve with the groove. That is, in the embodiment depicted in FIG. 5 and FIG. 6, the top pivot 116 may ride within the curved groove 250, thus changing the distance between the top pivot 116 and the back 202 of the shell 200. Meanwhile, the bottom pivot 118 may ride along the substantially planar outer edge of the upper track 240, thus remaining a substantially constant distance from the back 202 of the shell 200. In this way, as the adjustable assembly is raised and lowered, the headrest member 110 may automatically tilt backwards (i.e., the upper end 112 of the headrest member 110 may tilt toward the back 202 of the shell 200). As will be appreciated by those skilled in the art, the amount of tilt may be varied, such as by modifying the amount of curvature of the groove.

Figure 10:
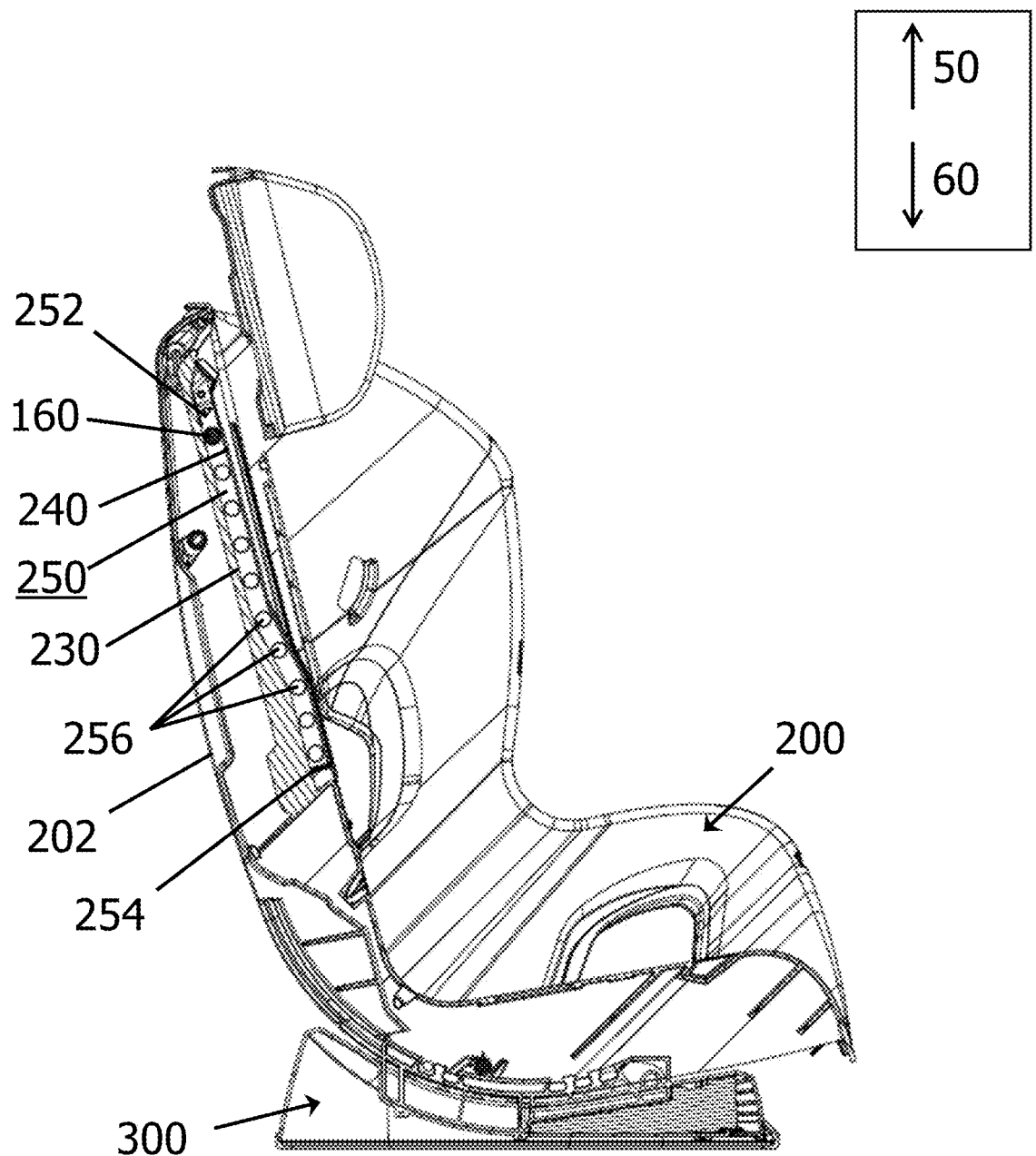
FIG. 10 is a side cutaway view of the child car seat of FIG. 8.
Figure 11:
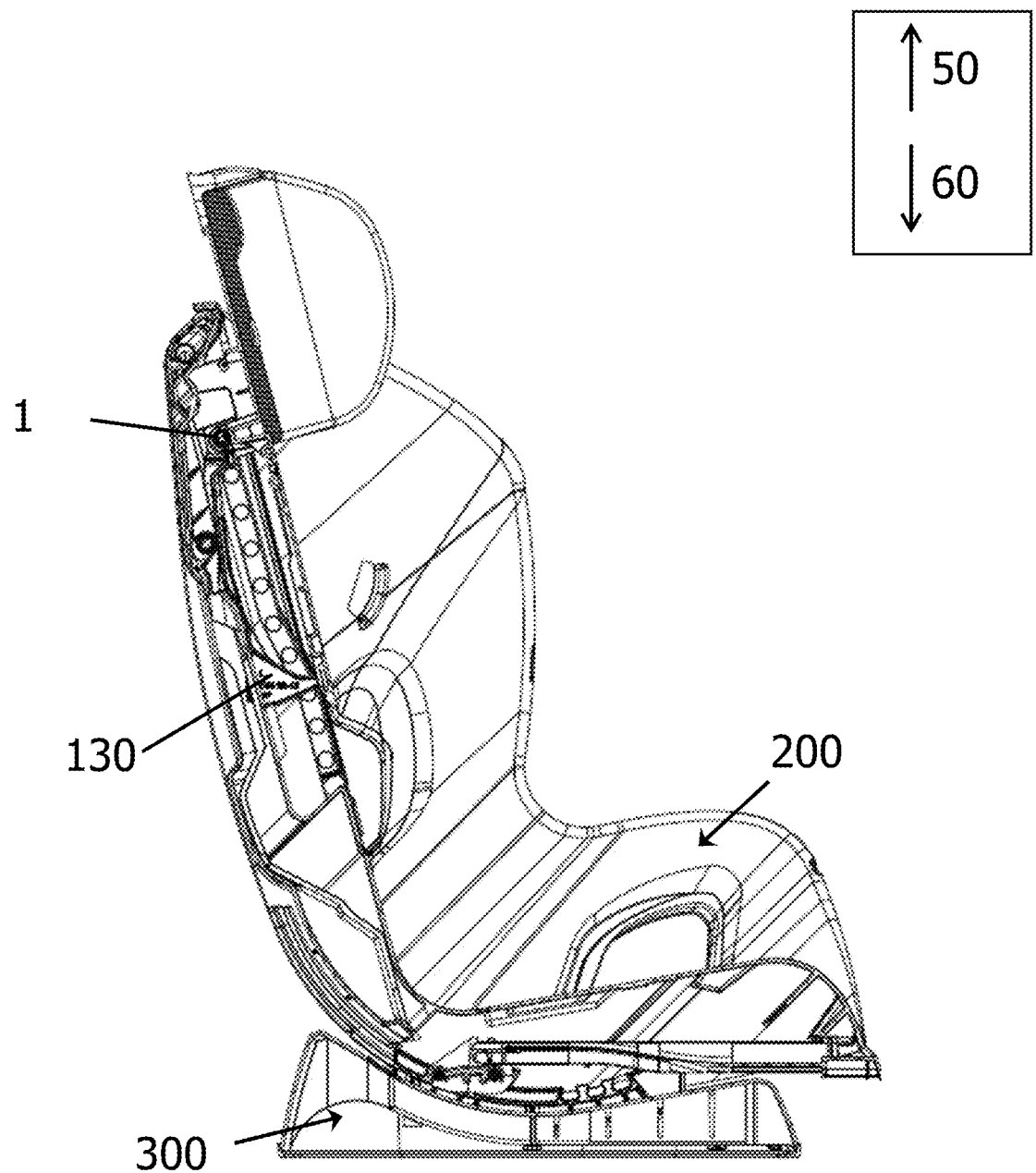
FIG. 11 is another side cutaway view of the child car seat of FIG. 8.
Figure 12:
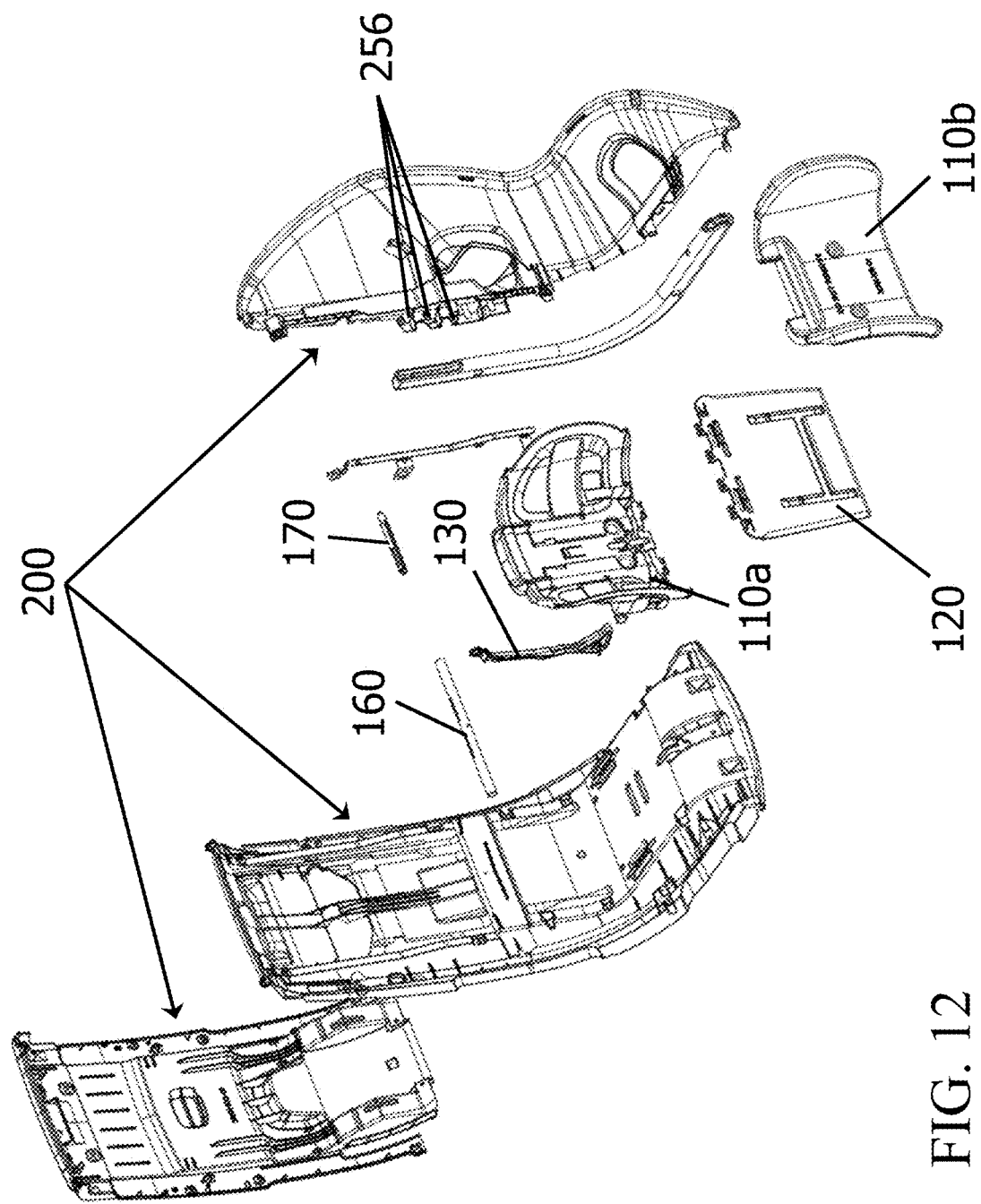
FIG. 12 is an exploded view of some of the components of the child car seat of FIG. 8.

In alternative embodiments, such as that shown in FIG. 10 and FIG. 11, the groove 250 between the lower track 230 and the upper track 240 of the first pair of tracks may be curved such that its top end 252 is located closer to the back 202 of the shell 200 than its bottom end 254. In such constructions, the bottom pivot 118 of the headrest member 110 may ride within the groove 250 as the adjustable assembly is raised and lowered. On the other hand, the top pivot 116 of the headrest member 110 may ride outside the groove 250 (i.e., along an outer edge of the lower track 230) as the adjustable assembly is raised and lowered.

Again, the track along which one of the pivots rides (in this embodiment the lower track 230 along which the top pivot 116 rides outside of the groove 250) may generally be designed so as to have a planar profile, such that said track does not curve with the groove. That is, in the embodiment depicted in FIG. 10 and FIG. 11, the bottom pivot 118 may ride within the curved groove 250, thus changing the distance between the bottom pivot 118 and the back 202 of the shell 200. Meanwhile, the top pivot 116 may ride along the substantially planar outer edge of the lower track 230, thus remaining a substantially constant distance from the back 202 of the shell 200. In this way, as the adjustable assembly is raised and lowered, the headrest member 110 may again automatically tilt backwards (i.e., the upper end 112 of the headrest member 110 may tilt toward the back 202 of the shell 200). Again, as will be appreciated by those skilled in the art, the amount of tilt may be varied, such as by modifying the amount of curvature of the groove.

As explained in detail herein, as the adjustable assembly 100 is lowered toward the seat portion 210 (i.e., in the direction of arrow 60), the lower end 124 of the backrest member 120 may automatically tilt forward. As may be best seen in FIG. 3, tilting of the backrest member 120 may be achieved by providing a cam rocker 130 that may urge the lower end 124 of the backrest member 120 toward the forward end 212 of the seat portion 210 of the shell 200. The cam rocker 130 may, in certain constructions, be operatively connected to the headrest member 110. In particular embodiments, the cam rocker 130 may be operatively connected to the headrest member 110 proximate the bottom pivot 118 thereof. For example, as shown in FIG. 3, the cam rocker 130 may be operatively connected to the headrest member 110 by a headrest tube 160 and an engagement pin 170 designed to snap into, lock into, or otherwise engage with the headrest tube 160 and cam rocker 130.

With reference to FIGS. 4, 5, 7 and 8, the back portion 220 of the shell 200 may include one or more slots 226. The slots 226 in the back portion 220 of the shell 200 may be adapted to accommodate the cam rocker 130 passing therethrough when the adjustable assembly is lowered. In particular, as the adjustable assembly is lowered toward the seat portion of the shell (i.e., in the direction of arrow 60), the cam rocker 130 may pass through the slot 226 in the back portion 220 of the shell 200. The cam rocker 130 may then contiguously engage with a rear surface 123 of the backrest member 120, such as is illustrated in FIG. 3. In this way, the cam rocker 130 may urge the lower end 124 of the backrest member 120 toward the forward end 212 of the seat portion 210 of the shell 200, which may thereby cause the backrest member 120 to automatically adjust and tilt.

Figure 3:
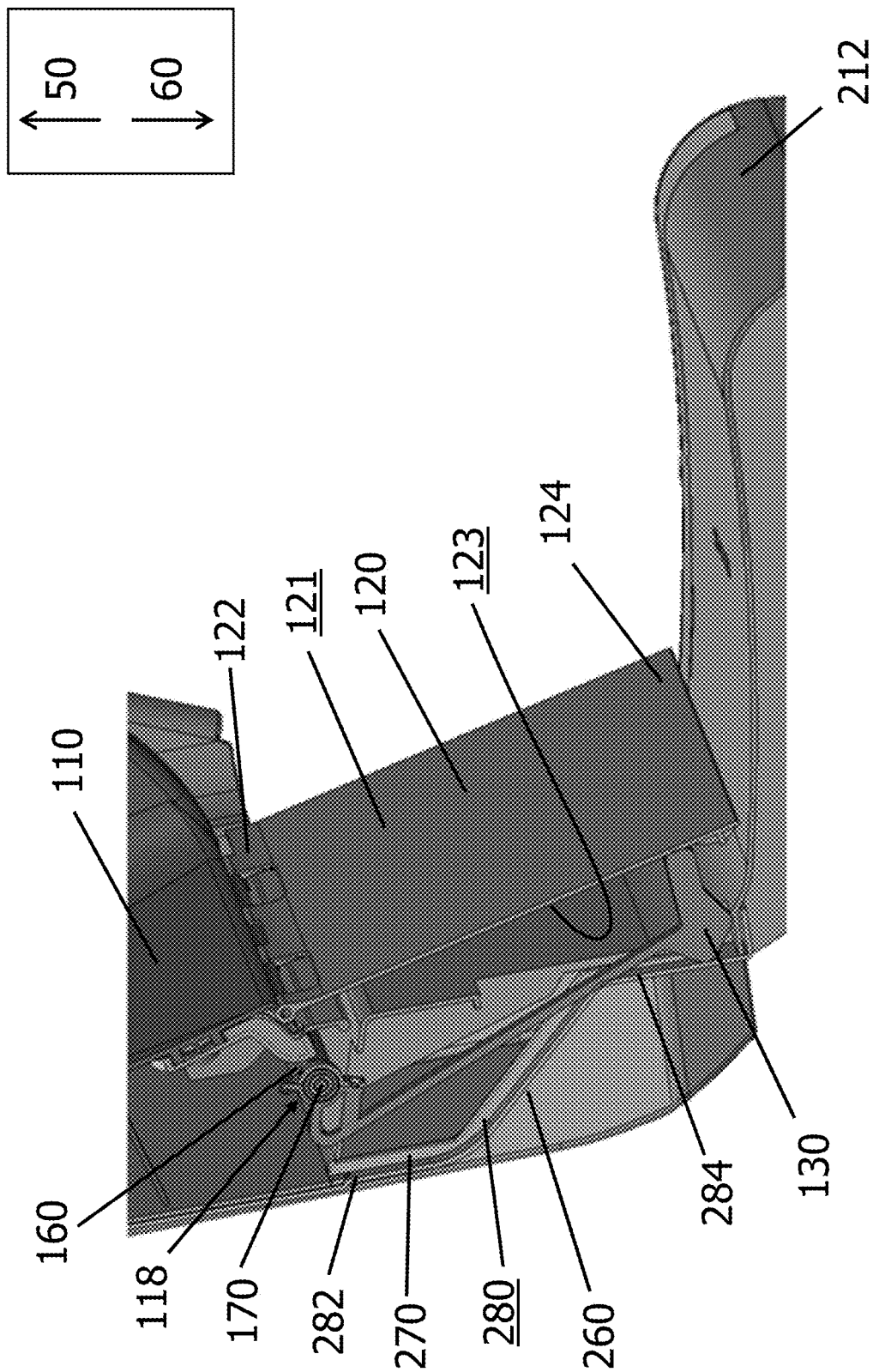
FIG. 3 is a perspective cutaway view of the child car seat of FIG. 1 with the adjustable assembly in the lowermost position.
Figure 7:
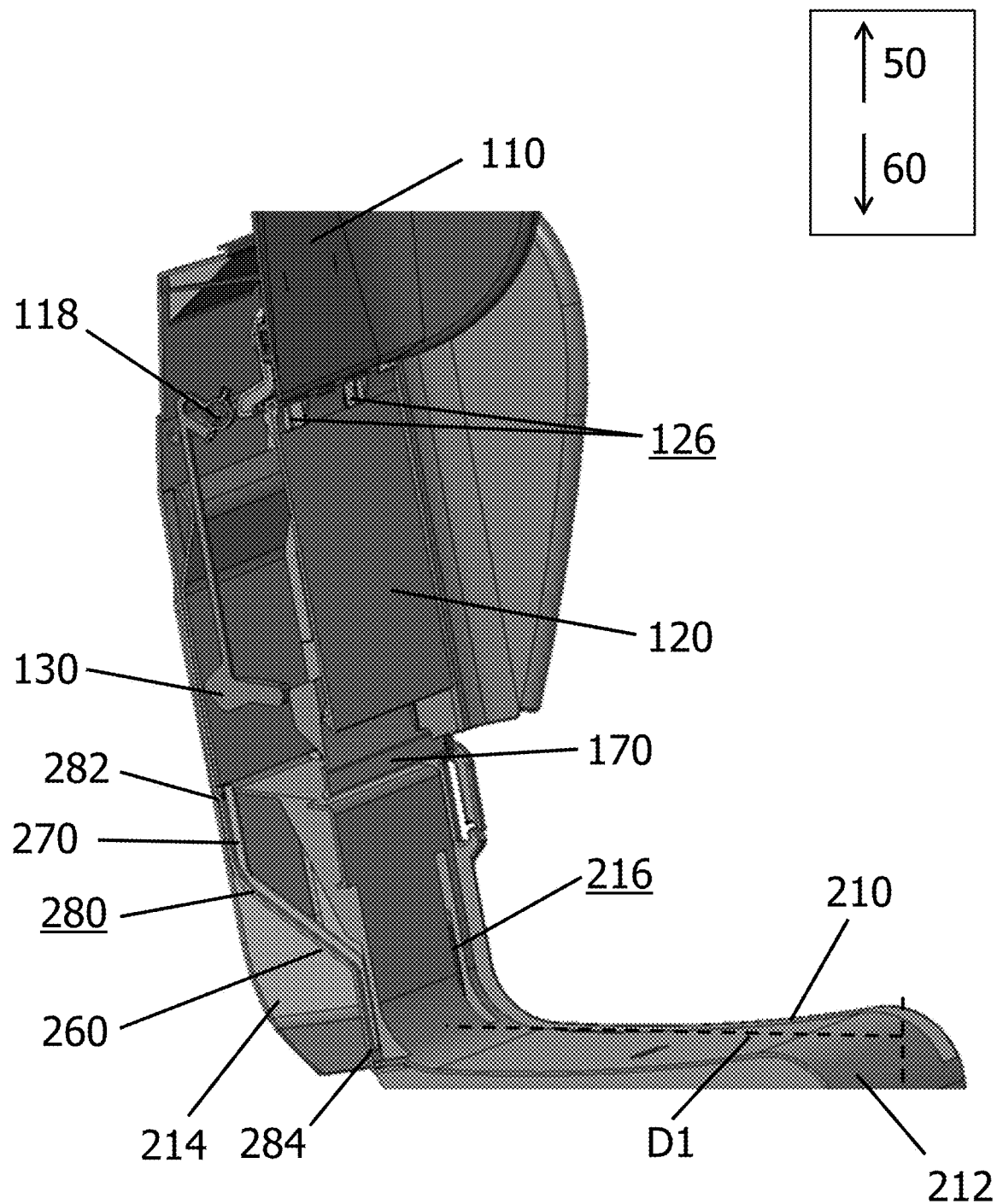
FIG. 7 is a perspective cutaway view of the child car seat of FIG. 1 with the adjustable assembly in the uppermost position.
Figure 13:
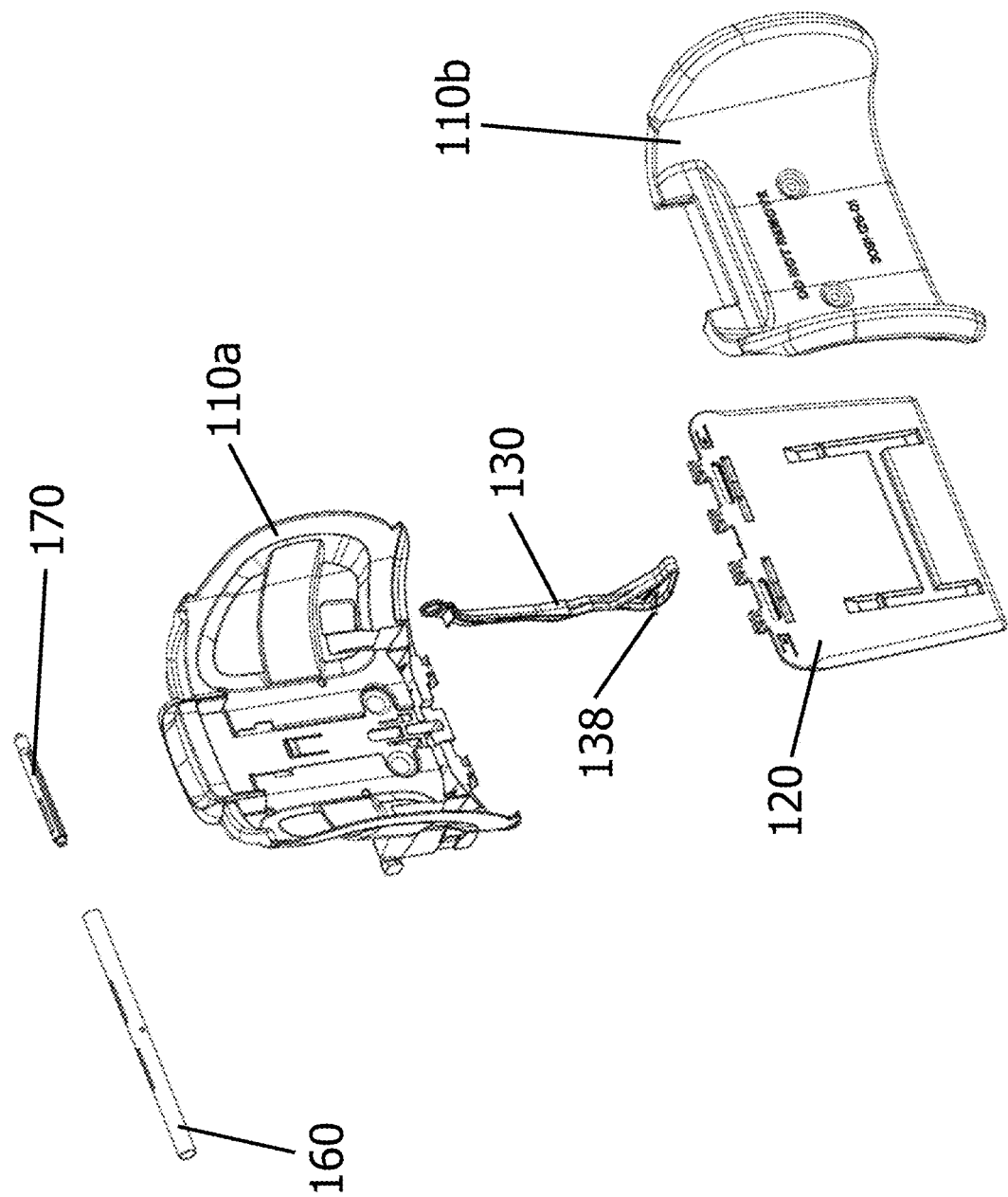
FIG. 13 is an exploded view of the adjustable assembly of the child car seat of FIG. 8.

With reference to FIG. 3 and FIG. 7, the shell 200 may include a second pair of tracks. The second pair of tracks may be adapted to accommodate the cam rocker 130. For example, as illustrated in FIG. 13, the cam rocker may, in certain constructions, include a rear post 138 adapted to operate as a pivot. In such embodiments, the second pair of tracks may be adapted to accommodate the rear post 138 of the cam rocker 130. For example, the second pair of tracks may include a lower track 260 and an upper track 270 that define a groove 280 therebetween. It should be noted that while FIG. 3 and FIG. 7 depict the groove 280 as a hollow space running between the lower and upper tracks 260, 270 the present disclosure is not limited to such embodiment and encompasses embodiments wherein the groove is designed as a notched or other non-hollow space sufficient to accommodate one or more of the top and bottom pivots of the headrest and may be of various different configurations, structures, sizes, or shapes.

The groove 280 may be curved from a top end 282 to a bottom end 284 thereof. In particular, as depicted in FIG. 3 and FIG. 7, the groove 280 may be curved such that its top end 282 is located closer to the back 202 of the shell 200 than its bottom end 284. In alternative embodiments, the groove 280 may be curved such that its bottom end 284 is located closer to the back 202 of the shell 200 than its bottom end 282. In this regard, groove 280 defined by the second pair of tracks may, in certain constructions, generally curve opposite groove 250 defined by the first pair of tracks. For example, where curve 250 curves from its top end 252 to its bottom end 254 toward the forward end 212 of seat portion 210, groove 280 can curves from its top end 282 to its bottom end 284 away from the forward end 212 of seat portion 210. Put another way, groove 280 defined by the second pair of tracks and groove 250 defined by the first pair of tracks may be reflectionally symmetrical about a longitudinal line of symmetry running therebetween.

As may be best seen in FIG. 3, the cam rocker 130 (e.g., the rear post of the cam rocker) may ride within groove 280 as the adjustable assembly is raised and lowered. As a result, as the cam rocker 130 rides within the groove 280 as the adjustable assembly is raised and lowered, the distance between the cam rocker 130 (e.g., the rear post of the cam rocker) and the back 202 of the shell 200 changes. In this way, as the adjustable assembly is raised and lowered, the cam rocker may pass through the slot 226 in the back portion 220 in the shell and contiguously engage with the rear surface 123 of the backrest member 120 (e.g., proximate the lower end 124 of the backrest member 120), thereby urging the lower end 124 of the backrest member 120 toward the forward end 212 of the seat portion 210 of the shell 200. As will be appreciated by those skilled in the art, the amount that the cam rocker urges the backrest member forward may be varied, such as by modifying the amount of curvature of the groove.

While the adjustable assembly 100 has been previously described as being selectively positionable at uppermost and lowermost positions, it will be appreciated that the adjustable assembly may further be selectively position at any desired location between the uppermost and lowermost positions. For example, turning to FIG. 10 and FIG. 12, it is illustrated that the shell 200 may be designed with a plurality of stop positions 256. In particular, the stop positions 256 may be, for example, bar-receiving slots adapted to receive the headrest tube 160. In this way, the adjustable assembly may be intermediately positioned between the uppermost and lowermost positions to further accommodate occupants of different and changing sizes. That is, the stop positions 256 may generally correspond to varying vertical heights above the seat portion 210 of the shell 200 at which the adjustable assembly may be selectively positioned.

As illustrated in FIGS. 1-3, 8, and 9, the headrest member 110 may include a release handle 140. The release handle 140 may be located proximate the upper end 112 of the headrest member 110. The release handle 140 may be adapted to selectively move and position the adjustable assembly relative 100 to the shell 200. In particular, the release handle 160 may be operatively connected to the headrest tube 160 and may be adapted to raise and lower the adjustable assembly and selectively position the headrest tube 160 in one of the plurality of stop positions 256 in the shell 200.

The stop positions 256 may be adapted to receive at least a portion of the headrest tube 160 when it is desired to selectively position the adjustable assembly at a desired vertical height above the seat portion 210 of the shell 200. The release handle 140 may be designed to cause the headrest tube 160 to engage or disengage with the stop positions 256 of the shell 200 so as to facilitate the ability to raise and lower the adjustable assembly as desired. For example, the release handle 140 may be adapted to effect inward compressive movement on the headrest tube 160 or a pin 170 inserted therein so as to cause the headrest tube 160 or pin 170 to selective disengage from interlocking engagement with a corresponding one of the stop positions 256, thereby facilitating vertical height adjustment of the adjustable assembly. After selectively raising or lowering the adjustable assembly, removal of the compressive force may then effect re-engagement of the headrest tube 160 or pin 170 with another one of the stop positions 164.

The shell 200 of the car seat 10 may be formed from, for example, injection-molded plastic. With reference to FIG. 13, the adjustable assembly 100 may be comprised of a base structure 150a and an energy-absorbing structure 150b adapted to cooperatively fit with the base structure 150a. The base structure 150a may be formed from, for example, injection-molded plastic. The energy-absorbing structure 150b may be formed from an energy-absorbing material, such as open-cell foam, closed-cell foam, or expanded polystyrene. While particular materials for use in connection with the disclosed car seat have been described, it will be appreciated that other materials may be used as well.

While particular exemplary embodiments have been described, it is not intended that the claims be limited thereto, as it is intended that the claims be as broad in scope as the art will allow and that the specification be read likewise. That is, the foregoing description of specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It will be appreciated by those of ordinary skill in the art that the components, method steps and materials illustrated above may be varied by substitution of equivalent components, steps and materials capable of performing the same functions. It will also be appreciated by one of ordinary skill in the art that sizes and strengths of the components may be scaled up or down as required for specific purposes. The claims hereof are intended to encompass all such equivalent components, method steps and scales.

What is claimed is:

1. A child car seat, comprising:
    a shell including a seat portion and a back portion extending upwardly away from the seat portion; and
    an adjustable assembly mounted for sliding movement relative to the shell and positionable between at least an uppermost position and a lowermost position, the adjustable assembly including a headrest member and a backrest member hingedly connected to the headrest member;
    wherein a first angle is defined between a front surface of the backrest member and a front surface of the headrest member; and
    wherein movement of the adjustable assembly downwardly toward the seat portion of the shell increases the first angle, and movement of the adjustable assembly upwardly away from the seat portion of the shell decreases the first angle.

2. The child car seat of claim 1, wherein a lower end of the headrest member is transversely hingedly connected to an upper end of the backrest member.

3. The child car seat of claim 1, wherein the first angle is less than or equal to 180° when the adjustable assembly is in the uppermost position, and the first angle is greater than 180° when the adjustable assembly is in the lowermost position.

4. The child car seat of claim 1, wherein, when the adjustable assembly is in the lowermost position, a lower end of the backrest member is positioned contiguously with a top surface of the seat portion of the shell and a second angle defined between the front surface of the backrest member and the top surface of the seat portion of the shell is greater than 90°.

5. The child car seat of claim 1, wherein the backrest member includes at least one harness slot proximate an upper end thereof, and wherein movement of the adjustable assembly downwardly toward the seat portion of the shell decreases the distance between the harness slot and a top surface of the seat portion of the shell.

6. The child car seat of claim 1, further comprising at least one cam rocker adapted to pass through a slot in the back portion of the shell and contiguously engage with a rear surface of the backrest member to urge a lower end of the backrest member toward a forward end of the seat portion of the shell when the adjustable assembly is moved downwardly toward the seat portion of the shell.

7. The child car seat of claim 6, wherein the shell includes a first pair of tracks defining a first groove therebetween that curves from a top end to a bottom end thereof, and a second pair of tracks defining a second groove therebetween that curves from a top end to a bottom end thereof, the first and second grooves being longitudinally spaced apart from one another.

8. The child car seat of claim 7, wherein the headrest member includes top and bottom pivots, one of which rides within the first groove and the other of which rides outside the first groove when the adjustable assembly is moved relative to the shell, and wherein the at least one cam rocker rides within the second groove when the adjustable assembly is moved relative to the shell.

9. The child car seat of claim 1, wherein movement of the adjustable assembly downwardly toward the seat portion of the shell causes a front surface of the headrest to tilt rearwardly, and movement of the adjustable assembly upwardly away from the seat portion of the shell causes the front surface of the headrest to tilt forwardly.

10. A child car seat, comprising:
    a shell including a seat portion having a forward end and a rear end and a back portion having an upper end and a lower end, the back portion extending upwardly away from the rear end of the seat portion; and
    an adjustable assembly mounted for sliding movement relative to the shell and positionable between at least an uppermost position and a lowermost position, the adjustable assembly including a headrest member having an upper end and a lower end and a backrest member having an upper end and a lower end, the backrest member hingedly connected to the headrest member;
    wherein movement of the adjustable assembly downwardly toward the seat portion of the shell urges the lower end of the backrest member closer to the forward end of the seat portion of the shell, thereby effectively lessening a usable depth of the seat portion of the shell;
    wherein the adjustable assembly further comprises at least one cam rocker adapted to pass through a slot in the back portion of the shell and contiguously engage with a rear surface of the backrest member to urge the lower end of the backrest member toward the forward end of the seat portion of the shell when the adjustable assembly is moved downwardly toward the seat portion of the shell; and
    wherein the back portion of the shell includes a first pair of tracks defining a first groove therebetween that curves from a top end to a bottom end thereof, and a second pair of tracks defining a second groove therebetween that curves from a top end to a bottom end thereof, the first and second grooves being longitudinally spaced apart from one another.

11. The child car seat of claim 10, wherein the headrest member includes top and bottom pivots, one of which rides within the first groove and the other of which rides outside the first groove when the adjustable assembly is moved relative to the shell, and wherein the at least one cam rocker rides within the second groove when the adjustable assembly is moved relative to the shell.

12. The child car seat of claim 10, wherein movement of the adjustable assembly downwardly toward the seat portion of the shell causes a front surface of the headrest to tilt rearwardly, and movement of the adjustable assembly upwardly away from the seat portion of the shell causes the front surface of the headrest to tilt forwardly.

13. A child car seat, comprising:
    a shell including a seat portion, a back portion extending upwardly away from the seat portion and including a slot, a first pair of tracks defining a first groove therebetween that curves from a top end to a bottom end thereof, and a second pair of tracks defining a second groove therebetween that curves from a top end to a bottom end thereof, the first and second grooves being longitudinally spaced apart from one another;
    an adjustable assembly mounted for sliding movement relative to the shell, the adjustable assembly including a headrest member and a backrest member hingedly connected to the headrest member, the headrest member including top and bottom pivots, one of which rides within the first groove and the other of which rides outside the first groove when the adjustable assembly is moved relative to the shell; and at least one cam rocker adapted to pass through the at least one slot in the back portion of the shell and contiguously engage with a rear surface of the backrest member to urge a lower end of the backrest member outwardly away from the shell when the adjustable assembly is moved downwardly toward the seat portion of the shell, wherein the at least one cam rocker rides within the second groove when the adjustable assembly is moved relative to the shell.

14. The child car seat of claim 13, wherein the adjustable assembly includes a release handle located proximate the upper end of the headrest member, the release handle adapted to selectively move and position the adjustable assembly relative to the shell.

15. The child car seat of claim 13, wherein the rocker cam is mounted on the headrest member.

\* \* \* \* \*